United States Patent
Zhao

(10) Patent No.: US 10,929,686 B2
(45) Date of Patent: Feb. 23, 2021

(54) IMAGE PROCESSING APPARATUS AND METHOD AND STORAGE MEDIUM STORING INSTRUCTIONS

(71) Applicant: CANON KABUSHIKI KAISHA, Tokyo (JP)

(72) Inventor: Xuyu Zhao, Beijing (CN)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/355,585

(22) Filed: Mar. 15, 2019

(65) Prior Publication Data

US 2019/0294887 A1 Sep. 26, 2019

(30) Foreign Application Priority Data

Mar. 22, 2018 (CN) .......................... 201810240161.6
Oct. 30, 2018 (CN) .......................... 201811277443.X

(51) Int. Cl.
| | | |
|---|---|---|
| G06K 9/00 | (2006.01) | |
| G06T 7/194 | (2017.01) | |
| G06T 7/254 | (2017.01) | |
| G06K 9/03 | (2006.01) | |

(52) U.S. Cl.
CPC ..... *G06K 9/00765* (2013.01); *G06K 9/00718* (2013.01); *G06K 9/00758* (2013.01); *G06K 9/03* (2013.01); *G06T 7/194* (2017.01); *G06T 7/254* (2017.01)

(58) Field of Classification Search
CPC combination set(s) only.
See application file for complete search history.

(56) References Cited

U.S. PATENT DOCUMENTS

| | | | | |
|---|---|---|---|---|
| 8,520,894 B2* | 8/2013 | Gupta | .................. | G06T 7/32 |
| | | | | 382/103 |
| 8,576,303 B2* | 11/2013 | Vendrig | ............... | H04N 5/2226 |
| | | | | 348/239 |
| 8,639,026 B2 | 1/2014 | Lin | | |
| 9,247,155 B2* | 1/2016 | Gupta | ................... | G06T 7/194 |
| 9,911,058 B2* | 3/2018 | Gupta | ................... | G06T 7/194 |
| 2007/0160289 A1 | 7/2007 | Lipton | | |
| 2008/0181507 A1* | 7/2008 | Gope | ................... | G06T 7/194 |
| | | | | 382/190 |

(Continued)

FOREIGN PATENT DOCUMENTS

| | | |
|---|---|---|
| JP | 2009-265827 A | 11/2009 |
| JP | 2011-209966 A | 10/2011 |

*Primary Examiner* — Tsung Yin Tsai
(74) *Attorney, Agent, or Firm* — Canon U.S.A., Inc. IP Division

(57) ABSTRACT

The present invention discloses an image processing apparatus and method and storage medium storing instructions. The image processing apparatus comprises a unit for acquiring a current video frame and a scene model based on an input video, a unit for updating visual element models in said scene model, which match with the visual elements in said current video frame, based on the visual elements in said current video frame, and a unit for updating visual element models in said scene model, which do not match with the visual elements in said current video frame, based on the visual elements in said current video frame and in the previous video frames thereof. According to the present disclosure, the whole scene model can vary immediately following the variation in the environment illumination.

11 Claims, 10 Drawing Sheets

(56) References Cited

U.S. PATENT DOCUMENTS

| | | | |
|---|---|---|---|
| 2009/0087086 A1 | 4/2009 | Eaton | |
| 2011/0043625 A1* | 2/2011 | Cobb | G06K 9/00771 348/143 |
| 2011/0044537 A1* | 2/2011 | Cobb | G06K 9/6222 382/165 |
| 2012/0106834 A1* | 5/2012 | Lin | G06K 9/00771 382/155 |
| 2012/0106837 A1* | 5/2012 | Partis | G06K 9/3241 382/165 |
| 2012/0106856 A1* | 5/2012 | Gupta | G06K 9/38 382/224 |
| 2012/0163658 A1* | 6/2012 | Pakulski | G06T 7/254 382/103 |
| 2012/0257053 A1* | 10/2012 | Gupta | H04N 7/181 348/143 |
| 2012/0288198 A1* | 11/2012 | Tojo | G06K 9/00771 382/173 |
| 2013/0002865 A1* | 1/2013 | Pakulski | H04N 19/23 348/143 |
| 2014/0301604 A1 | 10/2014 | Gupta | |

* cited by examiner

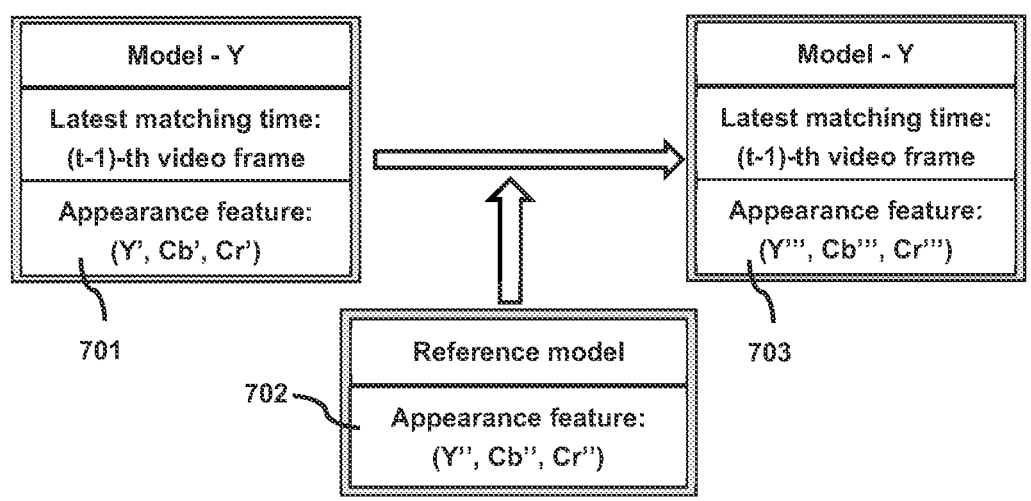
F I G. 7

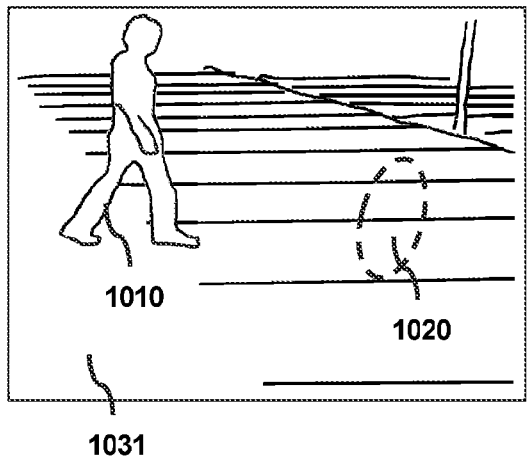
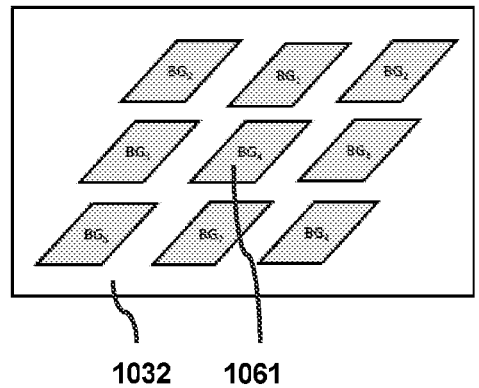
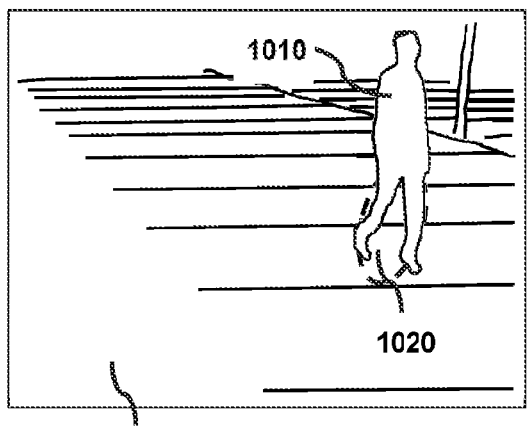
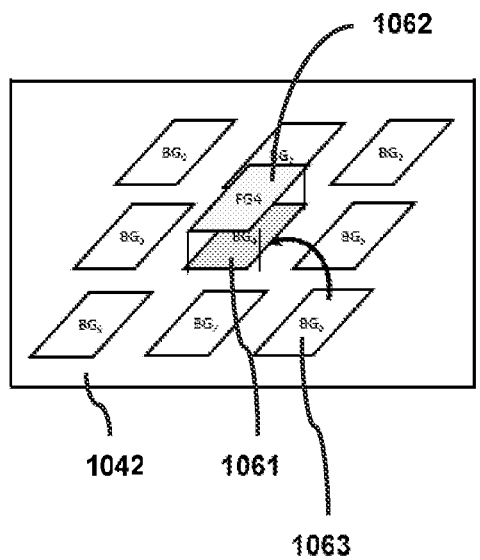
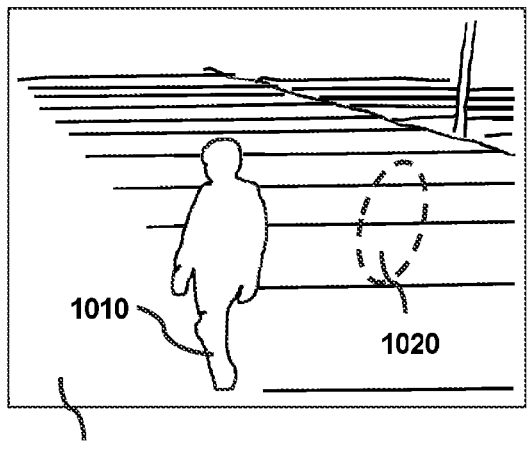
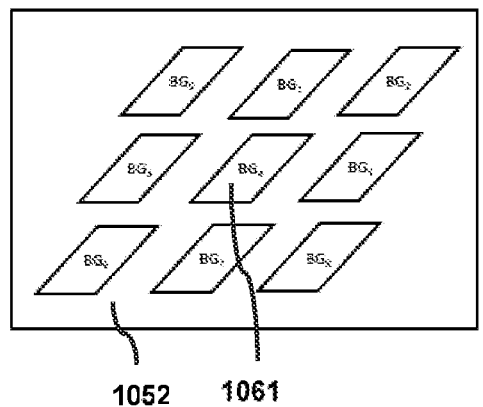
F I G. 10

IMAGE PROCESSING APPARATUS AND METHOD AND STORAGE MEDIUM STORING INSTRUCTIONS

CROSS-REFERENCE TO RELATED APPLICATIONS

This application is a Non Provisional Patent application, which claims the benefit of Chinese patent application No. 201810240161.6 filed Mar. 22, 2018, and Chinese patent application No. 201811277443.X filed Oct. 30, 2018, all of which are hereby incorporated by reference herein in their entirety.

BACKGROUND

Field of the Disclosure

The present disclosure relates to an image processing apparatus and an image processing method.

Description of the Related Art

In image processing, in one aspect, an image (for example, one video frame in a video) is generally composed of a plurality of visual elements, and the visual element is a visible element which contributes to expression of the image. Wherein, for example, one visual element may be one pixel, a DCT (Discrete Cosine Transform) block indicating a group of pixels, or an ultra-pixel indicating a group of pixels with similar attributes (for example, similar texture, similar color, similar illumination). On the other hand, especially in video monitoring, the existing background subtraction technique is usually used to detect, by comparing certain one video frame in a video with a scene model obtained based on video frames in certain one duration preceding to the one video frame in the video, a visual element in the one video frame as a foreground or a background. Wherein the foreground refers to a transient object appeared in the scene captured in the video. Such transient object may include for example moving person or object. The remaining portions in the scene are regarded as the background. In the actual application, some visual element which is the background in fact is wrongly detected as the foreground (i.e., false foreground) due to variation in the environment illumination, which will affect the accuracy of the foreground detection.

In order to reduce the influence caused by the variation in the environment illumination, the U.S. Pat. No. 8,639,026B2 illustratively discloses a method for removing the false foreground caused by the variation in the environment illumination. Wherein it is stated in this method that, in a case where the environment illumination varies, although it seems that the whole scene varies largely, the difference/variation between the adjacent two video frames is actually small, as long as the frame rate of the video is high enough. Thus, when detecting the foreground in certain one video frame, this method judges whether a false foreground exists in the foreground detected through the conventional background subtraction method, by comparing the difference between the one video frame with the previous one thereof. Wherein, for anyone of the visual elements classified as the foreground by the conventional background subtraction method, the visual element will be finally determined as the foreground, only in a case where a difference between the visual element and a corresponding visual element in the previous one video frame is larger than one threshold value or in a case where a visual element which is in the previous one video frame and corresponds to the visual element is also classified as the foreground; otherwise, the visual element will be regarded as a false foreground and be newly classified as a background. Therefore, according to this method, it is possible to remove a certain number of false foregrounds caused by the variation in the environment illumination by further confirming the detection result, that is to say, it is possible to reduce the influence on the foreground detection by the variation in the environment illumination to a certain extent.

However, under some circumstances, when the environment illumination varies, the influence caused by the variation in the environment illumination can't be reduced well according to the above illustrative method. For example, for certain one visual element which is a background in fact in a video frame, when the visual element appears again after being occluded by a foreground object (for example human, things, even a shadow projected from sky and so on), in one aspect, this visual element may be wrongly detected as a foreground since there is a large difference between this visual element and a background visual element model in a scene model, which corresponds to this visual element. On the other hand, since the state of this visual element becomes unoccluded from being occluded, it will be deemed that there is large difference between this visual element and a corresponding visual element in the previous one video frame (that is, a video frame preceding to the video frame in which this visual element newly appears), thus this visual element will be confirmed as a foreground finally according to the above illustrative method. Therefore, it is impossible to remove the false foreground caused by the variation in the environment illumination occurred under such circumstance well by the above illustrative method. In other words, it is impossible to reduce well the influence on the foreground detection due to the variation in the environment illumination under an occluded circumstance by the above illustrative method.

SUMMARY

In view of the recordation of the above Related Art, the present disclosure is directed to solve at least one of the above problems.

According to an aspect of the present disclosure, an image processing apparatus comprises: an acquiring unit for acquiring a current video frame and a scene model based on an input video, wherein said scene model includes visual element models at least representing appearance features in said current video frame and in previous video frames thereof, of visual elements; a first updating unit for updating visual element models in said scene model, which match with the visual elements in said current video frame, based on the visual elements in said current video frame; a second updating unit for updating visual element models in said scene model, which do not match with the visual elements in said current video frame, based on the visual elements in said current video frame and the previous video frames thereof.

According to another aspect of the present disclosure, an image processing method comprises: an acquiring step of acquiring a current video frame and a scene model based on an input video, wherein said scene model includes visual element models at least representing appearance features in said current video frame and in previous video frames thereof, of visual elements; a first updating step of updating visual element models in said scene model, which match with the visual elements in said current video frame, based on the visual elements in said current video frame; a second updating step of updating visual element models in said scene model, which do not match with the visual elements in said current video frame, based on the visual elements in said current video frame and the previous video frames thereof.

According to another aspect of the present disclosure, a storage medium storing instructions capable of causing a processor to execute the image processing method described above when executed by the processor.

Wherein, appearance features in video frame of visual elements include anyone of color feature, texture feature, and illumination feature.

By the present disclosure, not only visual element models in a scene model, which match with visual elements in a current video frame, can be updated immediately following the variation in the environment illumination, but also visual element models in a scene model, which do not match with visual elements in a current video frame, can be updated immediately following the variation in the environment illumination. Therefore, it is possible to make the whole scene model vary immediately following the variation in the environment illumination.

Further features and advantages of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description of the embodiments, serve to explain the principles of the present disclosure.

FIG. 7 schematically illustrates one exemplary "unmatched visual element model" and the updated model thereof.

FIG. 10 schematically shows an exemplary application scene using the present disclosure.

DESCRIPTION OF THE EMBODIMENTS

Figure 1:
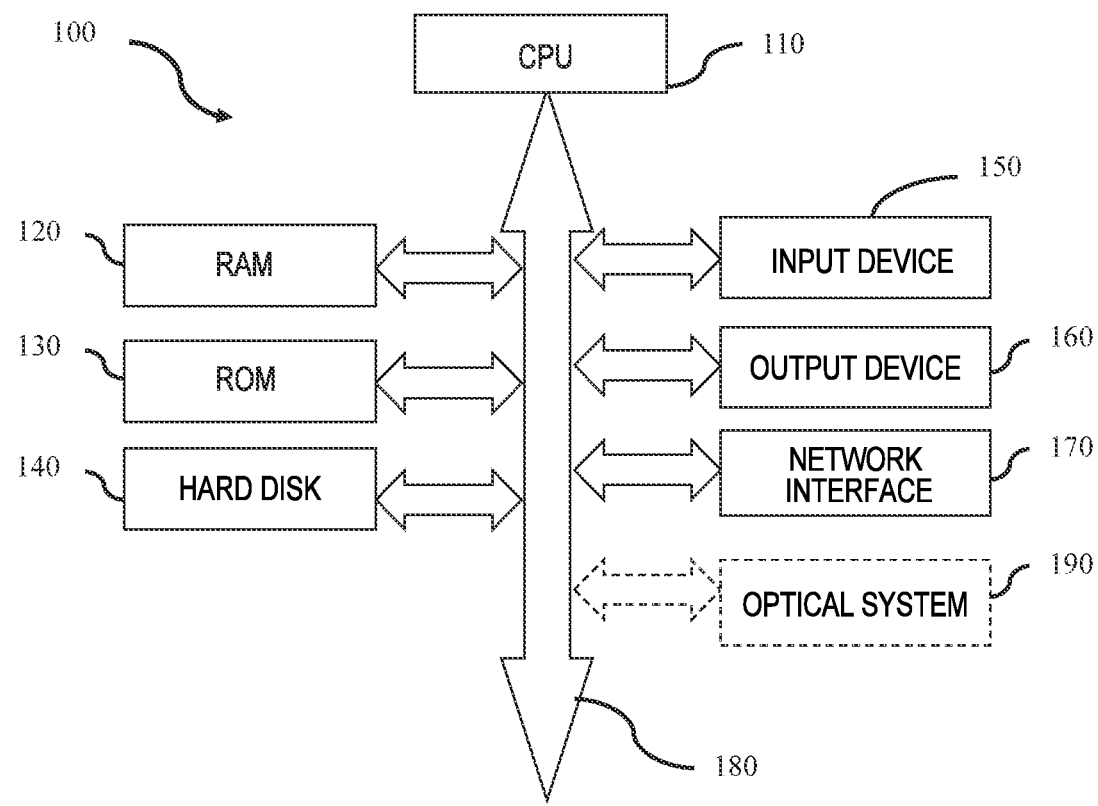
FIG. 1 is a block diagram schematically showing a hardware configuration which is capable of achieving a technique according to one or more aspects of the present disclosure.

Exemplary embodiments will be described in detail below with reference to the drawings. It should be noted that the following description is illustrative and exemplary in nature and is in no way intended to limit the disclosure, its application, or uses. The relative arrangement of the components and steps, the numerical expressions, and numerical values set forth in these embodiments do not limit the scope of the present disclosure unless it is specifically stated otherwise. In addition, the technique, method, device known by persons skilled in the art may not be discussed in detail, however, these shall be a part of the present specification under a suitable circumstance.

It is noted that, similar reference numerals and letters refer to similar items in the following figures, and thus once an item is defined in one figure, it may not be discussed for following figures.

The inventor thinks, in one aspect, when the environment illumination varies in the video, the visual element occluded by a foreground object (for example human, things, even a shadow projected from sky and so on) can't appear in the corresponding video frame, thus the visual element model corresponding to the visual element in the scene model can't vary immediately following the variation in the environment illumination. Therefore, when this visual element newly appears, the newly appeared visual element will still be wrongly detected even if the detection result on the newly appeared visual element is further confirmed by the illustrative method mentioned in the related art, since there is large difference between the newly appeared visual element and the visual element model corresponding to the visual element in the scene model.

On the other hand, regardless how the environment illumination varies in the video, and regardless whether some visual elements in the video are occluded by the foreground object, some visual elements which can vary immediately following the variation in the environment illumination always exist in a segment of continuous video frames. That is to say, regardless how the environment illumination varies, some visual elements which can vary immediately following the variation in the environment illumination always exist in a segment of continuous video frames, which makes the visual element models corresponding to these visual elements in the scene model can also always vary immediately following the variation in the environment illumination. In other words, these visual element models can be updated immediately following the variation in the environment illumination. However, for visual element models in the scene model, which can't vary immediately following the variation in the environment illumination (for example, visual elements corresponding to the visual element models in video are occluded by the foreground object), if these visual element models which can't vary immediately following the variation in the environment illumination can be updated by finding the associated visual element model (hereinafter, called as "reference visual element model") from the above visual element models which can vary immediately following the variation in the environment illumination, these visual element models which can't vary immediately following the variation in the environment illumination will also become capable of varying immediately following the variation in the environment illumination by corresponding updating operation. Therefore, for example, when the visual elements occluded in the video newly appear, the newly appeared visual elements are made to match with the visual element models corresponding to the visual elements in the scene model, thereby not being wrongly detected.

Therefore, it is possible to avoid effectively and well the influence on the foreground detection due to the variation in the environment illumination under an occluded circumstance by using the scene model updated according to the present disclosure, thereby improving the processing accuracy of the foreground detection.

Hereinafter, exemplary embodiments of the present disclosure will be described in detail with reference to the accompanying drawings.

(Hardware Configuration)

At first, the hardware configuration capable of achieving the technique described below will be described with reference to FIG. 1.

The hardware configuration 100 includes for example a central processing unit (CPU) 110, a random access memory (RAM) 120, a read only memory (ROM) 130, a hard disk 140, an input device 150, an output device 160, a network interface 170 and a system bus 180. In addition, in one implementation, the hardware configuration 100 can be implemented by a computer such as tablet computer, notebook computer, desktop computer, or other suitable electronic devices. In another implementation, the hardware configuration 100 can be implemented by a monitor such as digital camera, video camera, network camera or other suitable electronic devices. Wherein, in a case where the hardware configuration 100 is implemented by the monitor, the hardware configuration 100 further includes for example an optical system 190.

In one implementation, the image processing according to the present disclosure is configured by hardware or firmware, and serves as the modules or components of the hardware configuration 100. For example, the image processing apparatus 200 described in detail below with reference to FIG. 2 and the image processing apparatus 1100 described in detail below with reference to FIG. 11 serve as the modules or components of the hardware configuration 100. In another implementation, the image processing according to the present disclosure is configured by software which is stored in the ROM 130 or hard disk 140 and is executed by CPU 110. For example, the procedure 300 described in detail below with reference to FIG. 3 serves as a program stored in the ROM 130 or hard disk 140.

CPU 110 is any suitable programmable control device (for example, a processor) and can execute various kinds of functions to be described below by executing various kinds of application programs stored in the ROM 130 or hard disk 140 (for example memory). RAM 120 is used to temporarily store programs or data loaded from the ROM 130 or hard disk 140, and is also used as a space in which CPU 110 performs various kinds of procedures (for example, implementing the technique to be described in detail below with reference to FIGS. 3-9) and other available function. The hard disk 140 stores many kinds of information such as operating system (OS), various kinds of application, control program, video, scene model, processing result for each video frame of a video and/or predefined data (for example, threshold value (THs)).

In one implementation, the input device 150 is used to enable a user to interact with the hardware configuration 100. In one example, the user can input image/video/data through the input device 150. In another example, the user can trigger the corresponding processing of the present disclosure through the input device 150. In addition, a plurality of manners can be adopted as the input device 150, such as button, keyboard or touch screen. In another implementation, the input device 150 is used to receive image/video output from a special electronic device such as digital camera, video camera and/or network camera. In addition, in a case where the hardware configuration 100 is implemented by the monitor, the optical system 190 in the hardware configuration 100 will directly capture image/video at monitored position.

In one implementation, the output device 160 is used to display the processing result (for example foreground) to user. Moreover, various kinds of manners such as cathode ray tube (CRT) or liquid crystal display can be adopted as the output device 160.

The network interface 170 provides an interface for connecting the hardware configuration 100 to a network. For example, the hardware configuration 100 can perform a data communication with other electronic devices connected to network via the network interface 170. Alternatively, the hardware configuration 100 may be provided with a wireless interface to perform a wireless data communication. The system bus 180 can provide a data transmission path for mutually transmitting data among the CPU 110, the RAM 120, the ROM 130, the hard disk 140, the input device 150, the output device 160, the network interface 170 and the optical system 190. Although being called as a bus, the system bus 180 is not limited to any specific data transmission technique.

The above hardware configuration 100 is only illustrative and is in no way intended to limit the present disclosure, its application, or uses. Moreover, in order to simplification, only one hardware configuration is shown in FIG. 1. However, a plurality of hardware configurations may be used as required.

(Image Processing)

Next, the image processing according to the present disclosure will be described with reference to FIGS. 2 to 11.

Figure 2:
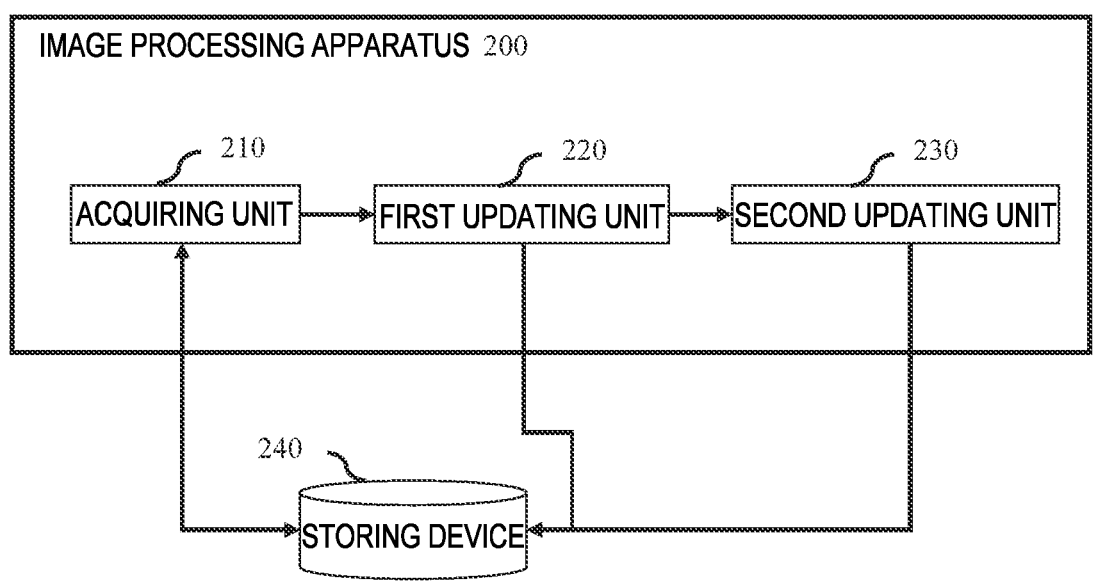
FIG. 2 is a block diagram illustrating a configuration of an image processing apparatus according to one or more aspects of the present disclosure.

FIG. 2 is a block diagram illustrating a configuration of the image processing apparatus 200 according to the first embodiment of the present disclosure. Wherein, a part of or all of modules shown in FIG. 2 can be implemented by special hardware. As shown in FIG. 2, the image processing apparatus 200 includes an acquiring unit 210, a first updating unit 220 and a second updating unit 230.

In addition, a storing device 240 shown in FIG. 2 stores for example video frames acquired from a video and processing result for each video frame (for example, the updated scene model, foreground detection result). For example, the video is input by a user or output from a special electronic device (for example a camera) or captured by the optical system 190 shown in FIG. 1. Alternatively, the acquired video frame and processing result can be stored in a different storing device. In one implementation, the storing device 240 is the ROM 130 or the hard disk 140 shown in FIG. 1. In another implementation, the storing device 240 is a server or an external storing device connected to the image processing apparatus 200 via a network (not shown).

At first, in one implementation, for example, in a case where the hardware configuration 100 shown in FIG. 1 is implemented by the computer, the input device 150 receives a video output from a special electronic device (for example a camera) or input by a user. Next, the input device 150 transfers the received video to the image processing apparatus 200 via the system bus 180. In another implementation, for example, in a case where the hardware configuration 100 is implemented by the monitor, the image processing apparatus 200 directly receives a video captured by the optical system 190.

Then, as shown in FIG. 2, in one aspect, the acquiring unit 210 acquires the current video frame from the received video (i.e., the input video) and stores it in the storing device 240. For example, the current video frame is the t-th video frame, wherein t is a natural number and is equal or larger than 2 (i.e., t≥2). Wherein, as described above, each video frame is constituted by a plurality of visual elements. On the other hand, the acquiring unit 210 acquires the scene model from the storing device 240. Wherein, the scene model includes visual element models which at least represent appearance features in the current video frame and the previous video frames of the current video frame, of the visual element. In other words, the scene model is obtained based on the current video frame and the previous video frame of the current video frame. Wherein, the visual element model in the scene model, which is obtained based on the previous video frames of the current video frame, is possibly updated by the first updating unit 220 and the second updating unit 230. Wherein, the appearance features in the video frame of the visual element include anyone of color feature, texture feature and illumination feature. Wherein, for one visual element, a plurality of visual element models corresponding to this visual element are included in the scene model. For example, assuming the current video frame is the t-th video frame, there are, for one visual element in the video frame, 1~t visual element models corresponding to this visual element in the scene model, wherein one visual element model at least represents appearance features at the same position in one video frame among the 1~t video frames, of the visual element. However, apparently, the present disclosure is not limited to this. For one visual element in the t-th video frame, the visual element models of which the number is less than t and corresponds to this visual element may also be included in the scene model.

After the current video frame and the scene model are obtained, the first updating unit 220 updates visual element models in the scene model, which match with the visual element in the current video frame, based on the visual elements in the current video frame. The second updating unit 230 updates visual element models in the scene model, which do not match with the visual elements in the current video frame, based on the visual elements in the current video frame and the previous video frames thereof. Wherein, hereinafter, the visual element models in the scene model, which match with the visual elements in the current video frame are called as for example "matched visual element models", and the visual element models in the scene model, which do not match with the visual elements in the current video frame are called as for example "unmatched visual element models".

In one implementation, before the first updating unit 220 and the second updating unit 230 perform the corresponding updating operation, the first updating unit 220 and the second updating unit 230 respectively determine the "matched visual element models" and the "unmatched visual element models" from the scene model based on the visual elements in the current video frame. In another implementation, the "matched visual element models" and the "unmatched visual element models" can be determined by special units. Thus, the image processing apparatus 200 shown in FIG. 2 may further include for example a determining unit (not shown), which may be arranged for example between the acquiring unit 210 and the first updating unit 220. Specifically, the determining unit determines the visual element models in the scene model as the "matched visual element models" and the "unmatched visual element models" based on the visual elements in the current video frame. In addition, based on determination results, the visual element models in the scene model may further represent additional features in the current video frame and the previous video frames thereof, of the visual elements, wherein the additional features include for example history records that the visual element models in the scene model are determined as the "matched visual element models" and the "unmatched visual element models" based on each video frame.

At last, after the visual element models in the scene model are updated, the first updating unit 220 and the second updating unit 230 transmit the updated visual element models to the storing device 240, such that the scene model stored in the storing device 240 may be updated so as to be used in the subsequent updating of the scene model and/or the subsequent processing (for example, the detection of the foreground in the subsequent video frame).

In addition, in a case where the current video frame is the first video frame of the input video, the scene model will not be updated in general.

Figure 3:
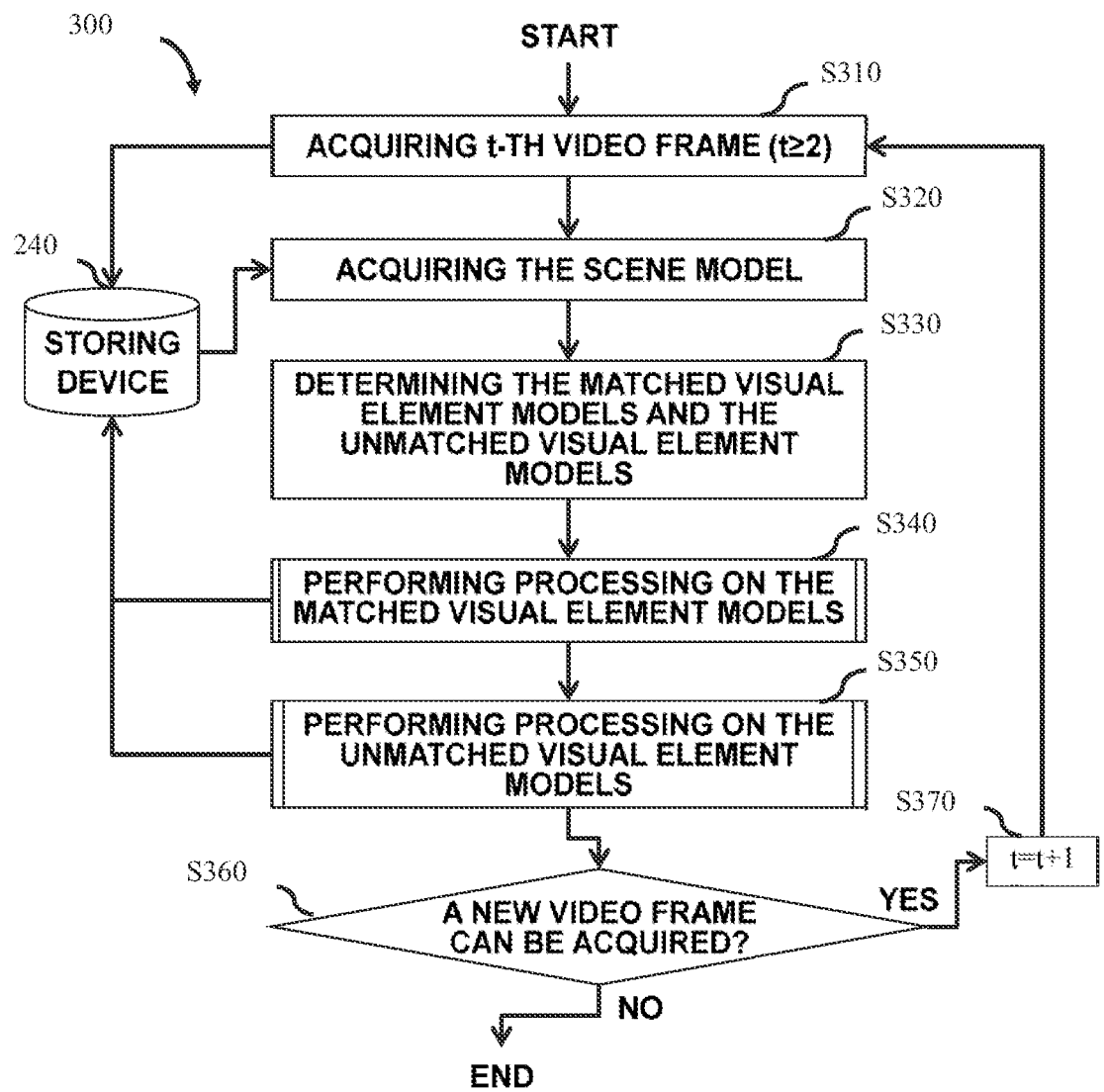
FIG. 3 schematically illustrates a flow chart of an image processing according to one or more aspects of the present disclosure.

A flow chart 300 shown in FIG. 3 is the corresponding procedure of the image processing apparatus 200 shown in FIG. 2. Wherein, in the flow chart 300, it is assumed that the above determining unit will be used to determine the "matched visual element models" and the "unmatched visual element models".

As shown in FIG. 3, in step S310, the acquiring unit 210 acquires t-th video frame from the received video (i.e., the input video) and stores the t-th video frame in the storing device 240, wherein t≥2.

In step S320, the acquiring unit 210 acquires the scene model from the storing device 240.

In step S330, the determining unit determines the visual element models in the scene model as the matched visual element models and the unmatched visual element models based on the visual elements in the t-th video frame. In one implementation, for anyone of visual element models in the scene model, the determining unit determines whether the visual element model is the "matched visual element model" or the "unmatched visual element model" based on the difference between the appearance feature of the visual element model and appearance feature of visual element in the t-th video frame, which corresponds to the visual element model. Wherein, the visual element model and the visual element in the t-th video frame, which corresponds to the visual element model have the same position in the video. Specifically, the determining unit firstly determines the difference between the appearance features of the visual element model and appearance features of visual element corresponding to the visual element model. Wherein, the difference is for example similarity between the texture feature/color feature/illumination feature of the visual element model and the texture feature/color feature/illumination feature of visual element corresponding to the visual element model. Wherein, for example, the above similarity is obtained by the existing matching method. Then the determining unit compares the determined similarity with the predefined threshold value (for example TH1), and in a case where the determined similarity is for example equal to or greater than TH1, the visual element model is deemed to be matched with the visual element corresponding to the visual element model, so that the visual element model is determined as the "matched visual element model". On the contrary, in a case where the determined similarity is for example less than TH1, the visual element model is deemed to be unmatched with the visual element corresponding to the visual element model, so that the visual element model is determined as the "unmatched visual element model".

Figure 4:
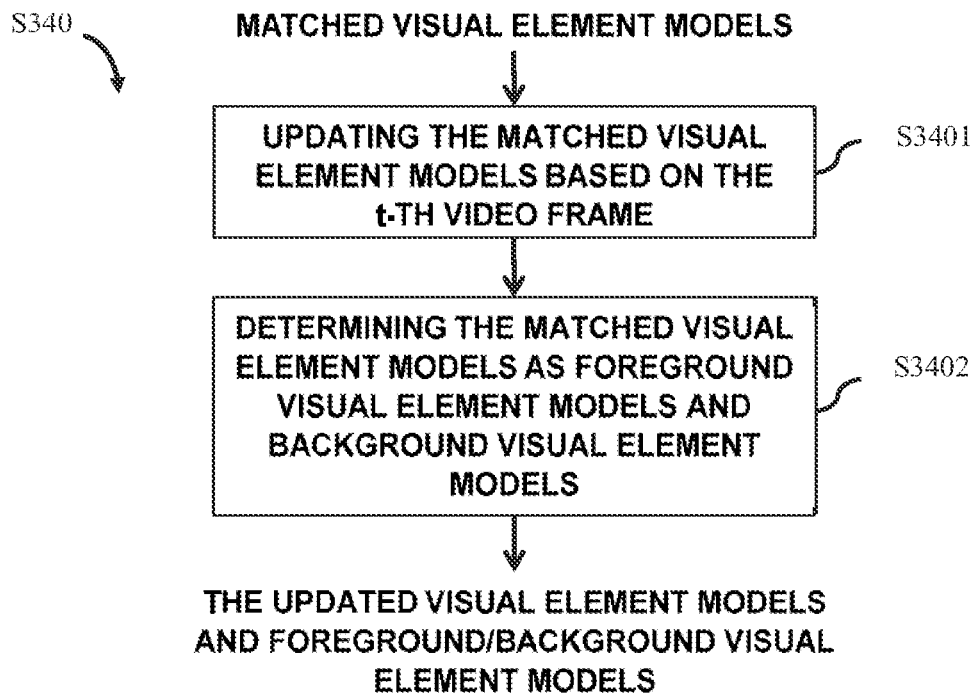
FIG. 4 schematically illustrates one flow chart of a step S340 as shown in FIG. 3 according to one or more aspects of the present.
Figure 5:
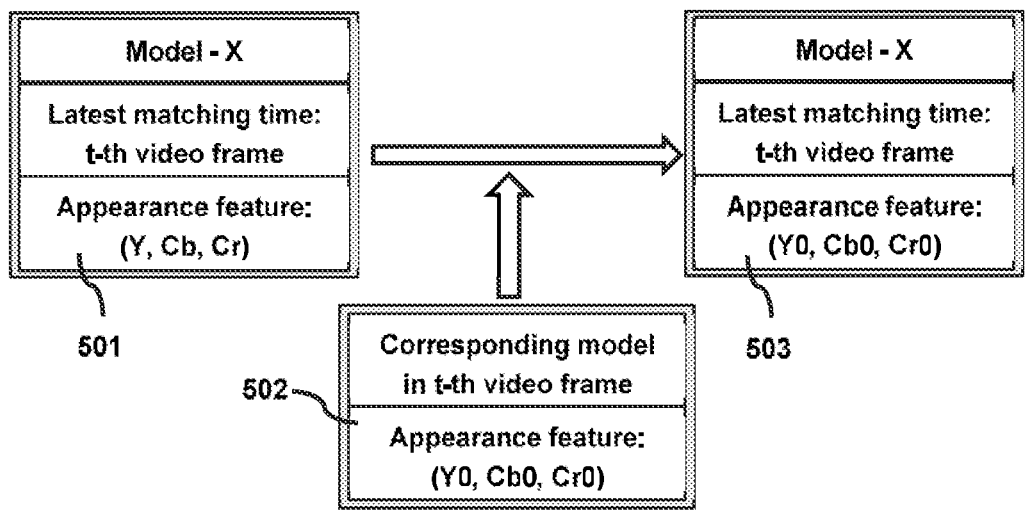
FIG. 5 schematically illustrates one exemplary "matched visual element model" and the updated model thereof.

In step S340, the first updating unit 220 performs corresponding processing on the "matched visual element models" determined in step S330. In one implementation, the processing for the "matched visual element models" by the first updating unit 220 will be described with reference to FIG. 4. As shown in FIG. 4, in step S3401, the first updating unit 220 updates the "matched visual element models" based on the visual elements in the t-th video frame, and stores the updated visual element models in the storing device 240. In one implementation, for anyone of the "matched visual element models", the first updating unit 220 directly replaces the appearance features of the "matched visual element model" for example with the appearance features of the visual element in the t-th video frame, which corresponds to the "matched visual element model". Taking one "matched visual element model" as an example with reference to FIG. 5, 501 denotes one "matched visual element model", 502 denotes the visual element in the t-th video frame which corresponds to 501, 503 denotes the "matched visual element model" 501 that is updated by the first updating unit 220. Assuming that 501 at least comprises the following record: latest matching time (e.g. t-th video frame) and appearance feature (e.g. (Y, Cb, Cr)), assuming that the appearance feature of 502 is (Y0, Cb0, Cr0), thereby, after the first updating unit 220 updates 501, the record of 503 (i.e. the updated 501) for example is latest matching time (e.g. t-th video frame) and appearance feature (e.g. (Y0, Cb0, Cr0)).

Returning to FIG. 4, in step S3402, the first updating unit 220 may further determine the "matched visual element model" as "foreground visual element model" and "background visual element model". Under this circumstance, the visual element model in the scene model may further represent temporal features in the current video frame (for example, the t-th video frame) and the previous video frames thereof, of the visual element. Wherein, for anyone of the visual element model in the scene model, the temporal features of this visual element model is for example temporal when the visual element in the video, which corresponds to this visual element model appears for the first temporal. In one implementation, for anyone of the "matched visual element models", the first updating unit 220 determines this "matched visual element model" as the foreground visual element model or the background visual element model, based on the temporal feature of the visual element in the t-th video frame, which corresponds to this "matched visual element model". For example, in a case where the temporal feature is equal to or greater than a predefined threshold value (for example, TH2), this "matched visual element model" will be determined as the "background visual element model". On the contrary, in a case where the temporal feature is less than the TH2, this "matched visual element model" will be determined as the "foreground visual element model". As described above, the visual element models in the scene model may represent additional features in the current video frame and the previous video frames thereof, of the visual element, and thus the first updating unit 220 may store the determination result for the "matched visual element model" (i.e., "foreground visual element model", "background visual element model") in the storing device 240, thereby, the history records for the "matched visual element models" in the additional features of the visual element models in the scene model may further include a record of the "foreground visual element model" and the "background visual element model". In addition, it will be understood by those skilled in the art that, the order of step S3401 and step S3402 shown in FIG. 4 is merely illustrative but not limiting. For example, step S3401 and step S3402 could be executed simultaneously. For example, it could execute step S3402 firstly and then executed step S3401.

Returning to FIG. 3, in step S350, the second updating unit 230 performs the corresponding processing on the "unmatched visual element model" determined in step S330. Wherein, the corresponding processing is that, the second updating unit 230 updates the "unmatched visual element models" based on the visual elements in the t-th video frame and the previous video frames thereof, and stores the updated visual element models in the storing device 240. Specifically, for anyone of the "unmatched visual element models", the second updating unit 230 updates this "unmatched visual element model" based on the difference between the appearance features in the t-th video frame of the reference visual element model associated with this visual element model and the appearance features in the previous video frames of the t-th video frame thereof.

In one implementation, the second updating unit 230 performs updating for each of the "unmatched visual element models". Assuming each video frame is constituted by N visual elements, wherein N is a natural number, then as described above, for the n-th visual element in the t-th video frame, the visual element models of which the number is not greater than t and corresponds to this visual element are included in the scene model. Assuming that total of M visual element models among the visual element models of which the number is not greater than t are determined as the "unmatched visual element models", wherein M is a natural number and satisfies 1≤M≤t, then for each of the M "unmatched visual element models", the updating processing for the "unmatched visual element models" by the second updating unit 230 will be described with reference to FIG. 6 by taking the m-th "unmatched visual element model" as an example.

Figure 6:
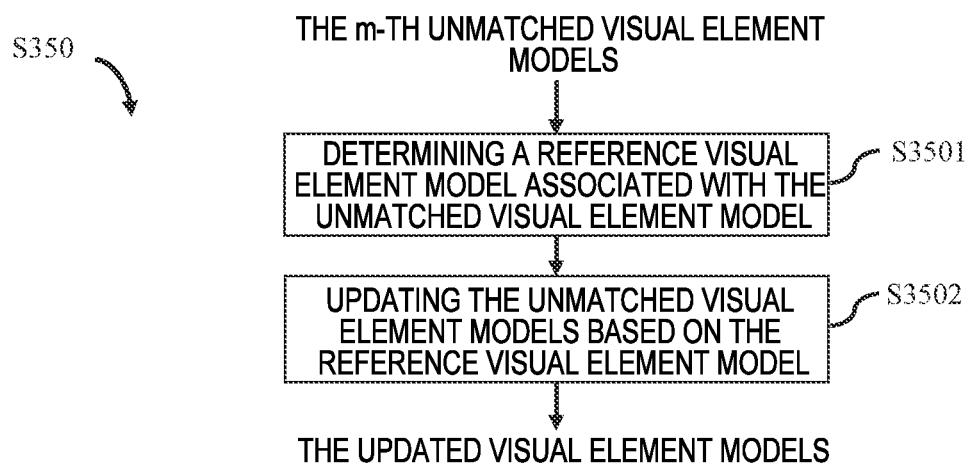
FIG. 6 schematically illustrates one flow chart of a step S350 as shown in FIG. 3 according to one or more aspects of the present disclosure.

As shown in FIG. 6, in step S3501, the second updating unit 230 determines a reference visual element model associated with the m-th "unmatched visual element model" from the scene model. In one implementation, the second updating unit 230 determines the reference visual element model by the following ways.

Firstly, the second updating unit 230 searches for a visual element model which is determined as the background visual element model not only based on the t-th video frame but also based on the previous video frames of the t-th video frame (for example, the (t−1)-th video frame, a plurality of frames before the t-th video frame), from the visual element models around the m-th "unmatched visual element model". Obviously, the found visual element model is the "matched visual element model" which can vary immediately following the variation in the environment illumination. As described above, the visual element model in the scene model can represent the additional features in the current video frame and the previous video frames thereof of the visual elements. Therefore, the second updating unit 230 can search for visual element models which satisfy the requirement based on for example the additional features of the visual element models around the m-th "unmatched visual element model".

Secondly, for each of the found visual element models, the second updating unit 230 determines the similarity between the appearance features (for example, texture feature, color feature, illumination feature) of this visual element model and the appearance features of the m-th "unmatched visual element model".

Then, the second updating unit 230 determines, from the found visual element models, a reference visual element model associated with the m-th "unmatched visual element model", based on the predetermined conditions and the determined similarity. In one implementation, the second updating unit 230 selects, from the found visual element models, one visual element model with the highest similarity as the reference visual element model associated with the m-th "unmatched visual element model". In another implementation, the second updating unit 230 selects anyone from the found visual element models with the similarity equal to or greater than a predefined threshold value (for example, TH3), as the reference visual element model associated with the m-th "unmatched visual element model".

Returning to FIG. 6, after the reference visual element model associated with the m-th "unmatched visual element model" is determined, in step S3502, the second updating unit 230 updates the m-th "unmatched visual element model" based on the difference between the appearance features in the t-th video frame of the determined reference visual element model and the appearance features in the previous video frames of the t-th video frame of the determined reference visual element model. In one implementation, the second updating unit 230 updates the m-th "unmatched visual element model" by the following ways.

Firstly, the second updating unit 230 calculates the feature difference between the texture feature/color feature/illumination feature in the t-th video frame of this reference visual element model and the texture feature/color feature/illumination feature in the video frame where this reference visual element model is located. Then, the second updating unit 230 superposes the calculated feature difference onto the texture feature/color feature/illumination feature of the m-th "unmatched visual element model" by a direct superposition manner or a weighted superposition way to reach the purpose of updating this "unmatched visual element model", such that this "unmatched visual element model" can also vary immediately following the variation in the environment illumination. Taking one "unmatched visual element model" as an example with reference to FIG. 7, as shown in FIG. 7, 701 denotes the m-th "unmatched visual element model", 702 denotes the reference visual element model associated with 701, 703 denotes the "unmatched visual element model" 701 that is updated by the second updating unit 230. Assuming that 701 at least comprises the following record: latest matching time (e.g. (t−1)-th video frame) and appearance feature (e.g. (Y', Cb', Cr')), assuming that the appearance features of 702 is (Y'', Cb'', Cr''), thereby, after the second updating unit 230 updates 701, the record of 703 (i.e. the updated 701) for example is latest matching time (e.g. (t−1)-th video frame) and appearance feature (e.g. (Y''', Cb''', Cr''')).

Since the background visual element in the video can embody the variation in the environment illumination in the video more, in order to enable the background visual element models in the scene model to vary more immediately following the variation in the environment illumination so as to prevent some background visual element models from being wrongly detected due to being occluded, the second updating unit 230 updates only a part of the "unmatched visual element models" in another implementation. For the n-th visual element in the t-th video frame, the description about the updating processing for the above M "unmatched visual element models" corresponding to the n-th visual element by the second updating unit 230 will be given with reference to FIG. 8.

Figure 8:
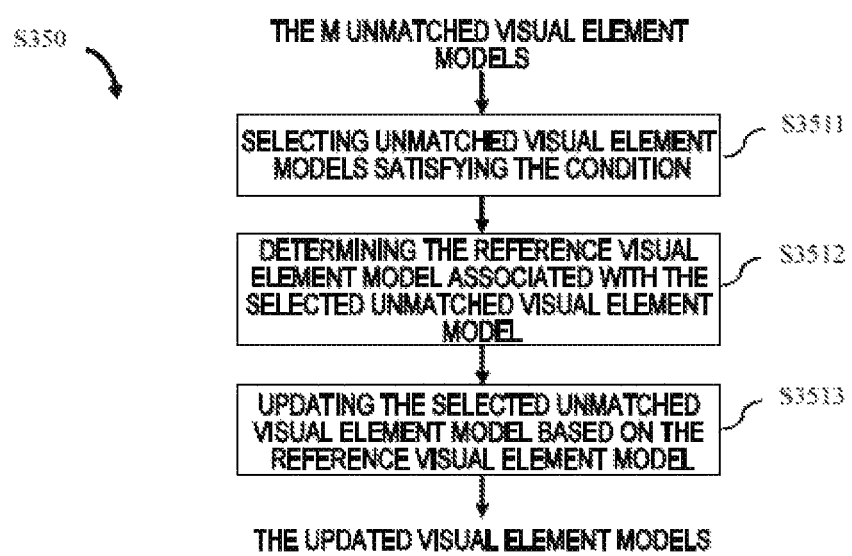
FIG. 8 schematically illustrates another flow chart of a step S350 as shown in FIG. 3 according to one or more aspects of the present disclosure.

As shown in FIG. 8, in step S3511, the second updating unit 230 selects J "unmatched visual element models" from the M "unmatched visual element models", wherein J is a natural number and satisfies 1≤J≤M. Wherein these J "unmatched visual element models" satisfy the following condition: they are determined as "matched" in performing a matching based on the visual elements corresponding to thereof in the previous video frames of the t-th video frame and also determined as the "background visual element models". As described above, the visual element models in the scene model may represent the additional features in the current video frame and the previous video frames thereof, of the visual elements. Therefore, the second updating unit 230 for example may selects the J "unmatched visual element models" based on the additional features of the M "unmatched visual element models". Preferably, for anyone of the M "unmatched visual element models", if it satisfies the above condition in the previous video frames closer to the t-th video frame, it means that the "unmatched visual element model" is more possibly a "background visual element model" which is occluded recently, and more needs to vary immediately following the variation in the environment illumination.

Figure 9:
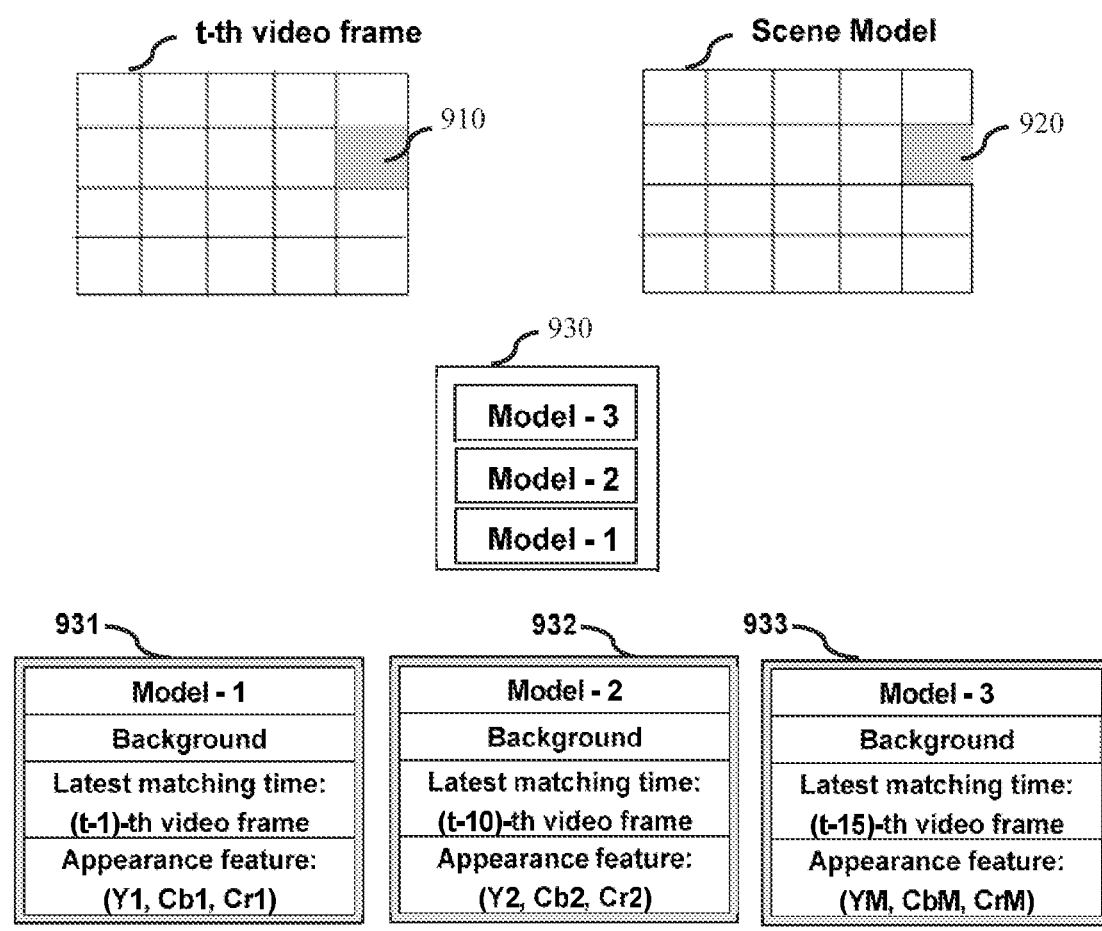
FIG. 9 schematically shows a current video frame, a scene model, samples of unmatched visual element models and records of the corresponding unmatched visual element models.

Therefore, in one implementation, the second updating unit 230 selects only one "unmatched visual element model" from these M "unmatched visual element models". Wherein the selected "unmatched visual element model" satisfies the above condition in one previous video frame closest to the t-th video frame (for example the (t−1)-th video frame). Taking the n-th visual element (the visual element 910 as shown in FIG. 9) in the t-th video frame as an example with reference to FIG. 9, as shown in FIG. 9, 920 denotes the visual element models in the scene model that correspond to the visual element 910, 930 denotes M "unmatched visual element models" corresponding to the visual element 910, assuming that M=3. Wherein, 931 denotes the exemplary record of Model-1 which means that Model-1 is determined as "matched" in performing a matching based on the visual elements corresponding to thereof in the (t−1)-th video frame and is also determined as the "background visual element model" and the corresponding appearance feature is (Y1, Cb1, Cr1). Wherein, 932 denotes the exemplary record of Model-2 and 933 denotes the exemplary record of Model-3. As described above, since Model-1 satisfies the above condition in (t−1)-th video frame which is closest to the t-th video frame, Model-1 will be selected by the second updating unit 230.

In another implementation, the second updating unit 230 selects "unmatched visual element models" of which the number is greater than one, from these M "unmatched visual element models". Wherein, these selected "unmatched visual element models" satisfy the above condition in previous video frames in a predefined temporal period before the t-th video frame (for example the (t−1)-th video frame to (t−10)-th video frame).

Returning to FIG. 8, for each of the selected J "unmatched visual element models", in step S3512, the second updating unit 230 determines the reference visual element model associated with this "unmatched visual element model" from the scene model. Since the corresponding processing of the step S3512 is the same as that of step S3501 in FIG. 6, the detailed description thereof will not be repeated herein.

For each of the selected J "unmatched visual element models", in step S3513, the second updating unit 230 updates this "unmatched visual element model", based on the difference between the appearance features in the t-th video frame of the determined reference visual element model and appearance features in the previous video frames of the t-th video frame of the determined reference visual element model. Since the corresponding processing of the step S3513 is the same as that of step S3502 in FIG. 6, the detailed description thereof will not be repeated herein.

In the implementation shown in FIG. 8, the selection processing of step S3511 is achieved by the second updating unit 230. Alternatively, the selection processing of step S3511 may be achieved by a special unit. In this case, the image processing apparatus 200 shown in FIG. 2 for example may further include a selection unit (not shown), which can be arranged between the first updating unit 220 and the second updating unit 230.

Returning to FIG. 3, after the visual element models in the scene model have been updated based on the t-th video frame, the second updating unit 230 in step S360 judges whether the acquiring unit 210 can acquire a new video frame. In a case where a new video frame can't be obtained, the procedure of the flow chart 300 ends. In a case where a new video frame can be obtained, in step S370, t=t+1 is set, and the corresponding processing from step S310 to step S360 are repeatedly performed.

As described above, according to the present disclosure, not only the visual element models in the scene model, which match with the visual elements in the current video frame can be updated immediately following the variation in the environment illumination, but also the visual element models in the scene model, which do not match with the visual elements in the current video frame can be updated immediately following the variation in the environment illumination. Therefore, the whole scene model can vary immediately following the variation in the environment illumination.

Hereinafter, taking a person who is walking through a street as an example with reference to FIG. 10, as shown in FIG. 10, video frame 1031 shows that the person 1010 is moving towards to the area 1020, video frame 1041 shows that the person 1010 has reached to the area 1020, video frame 1051 shows that the person 1010 has moved away from the area 1020. As for the visual elements in and around the area 1020, for example, 1032, 1042 and 1052 show the corresponding visual element models in the scene model, wherein the visual element models 1061 and 1062 are the visual element models corresponding to the area 1020 for example.

Assuming that video frame 1031 is the previous video frame, and in the previous video frame, the visual element models are determined as background visual element models (i.e. "$BG_0$"~"$BG_8$" in 1032). Thus, it can be seen that the visual element model 1061 is determined as the matched visual element model and is also determined as the background visual element model.

Assuming that video frame 1041 is the current video frame, and assuming that there are two visual element models (i.e. 1061 and 1062) corresponding to the area 1020. Wherein, in the current video frame, the visual element model 1062 is determined as a matched visual element model and is classified as the foreground visual element model. The visual element model 1061 is determined as an unmatched visual element model. As for the visual element model 1061, since it is determined as the matched visual element model and the background visual element model in video frame 1031 which is closest to video frame 1041, according to the present disclosure, the visual element model 1061 will be selected and updated by the second updating unit 230. Assuming that the visual element model 1063 is the reference visual element model associated with the visual element model 1061, thereby, the visual element model 1061 could be updated via the visual element model 1063.

In video frame 1051, since the visual element model 1061 has been updated according to the present disclosure, after the person 1010 moved away from the area 1020, the visual element model 1061 will be determined as the background visual element model rather than wrongly determined as the foreground visual element model. Wherein, in case the Related Art is applied in this situation rather than the present disclosure is applied, after the person 1010 moved away from the area 1020, the visual element model 1061 will be wrongly determined as the foreground visual element model.

Figure 11:
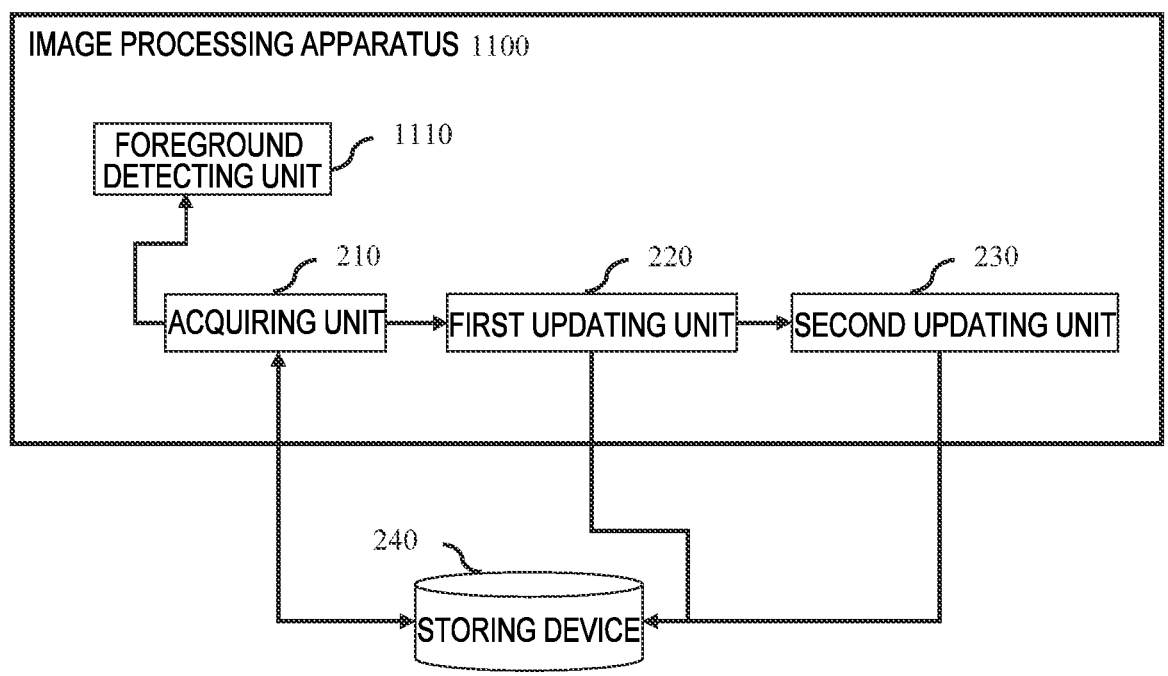
FIG. 11 is a block diagram illustrating a configuration of an image processing apparatus for a foreground detection according to one or more aspects of the present disclosure.

As described above, the scene model updated according to the present disclosure may be applied to the foreground detection, thus FIG. 11 is a block diagram illustrating a configuration of an image processing apparatus 1100 for a foreground detection according to embodiment of the present disclosure, as an illustrative application of the present disclosure. Wherein, a part of or all of modules shown in FIG. 11 may be implemented by a special hardware. As shown in FIG. 11, the image processing apparatus 1100 includes an acquiring unit 210, a first updating unit 220, a second updating unit 230 and a foreground detecting unit 1110.

In one aspect, since the acquiring unit 210, the first updating unit 220, the second updating unit 230 and the storing device 240 shown in FIG. 11 are the same as the corresponding portions shown in FIG. 2, the detailed description thereof will not be repeated herein.

On the other hand, as shown in FIG. 11, for the current video frame (for example, the t-th video frame) acquired by the acquiring unit 210 and the scene model acquired by the acquiring unit 210, the acquired scene model is a scene model which has been updated based on the previous video frames (for example, 1~(t−1) video frames) of the current video frame according to the present disclosure, and the foreground detecting unit 1110 detects, from the current video frame, a foreground based on the acquired scene model (i.e., the updated scene model) by using for example the existing background subtraction technique.

As described above, since the scene model updated according to the present disclosure can vary immediately following the variation in the environment illumination, it is possible to avoid effectively and well the influence on the foreground detection due to the variation in the environment illumination under an occluded circumstance by using the scene model updated according to the present disclosure, thereby improving the processing accuracy of the foreground detection.

All the above units are illustrative and/or preferable modules for achieving the processing in the present disclosure. These units may be hardware units (such as Field Programmable Gate Array (FPGA), Digital Signal Processor, Application Specific Integrated Circuit and so on) and/or software modules (such as computer readable program). Units for achieving each step are not described exhaustively above. However, in a case where a step for executing a specific procedure exists, a corresponding functional module or unit for achieving the same procedure may exist (implemented by hardware and/or software). The technical solutions of all combinations by the described steps and the units corresponding to these steps are included in the contents disclosed by the present application, as long as the technical solutions constituted by them are complete and applicable.

The methods and apparatuses of the present disclosure can be implemented in various forms. For example, the methods and apparatuses of the present disclosure may be implemented by software, hardware, firmware or any other combinations thereof. The above order of the steps of the present method is only illustrative, and the steps of the method of the present disclosure are not limited to such order described above, unless otherwise description is specified. In addition, in some embodiments, the present disclosure may also be implemented as programs recorded in recording medium, which include a machine readable instruction for achieving the method according to the present disclosure. Therefore, the present disclosure also covers the recording medium storing programs for achieving the method according to the present disclosure.

While the present disclosure has been described with reference to exemplary embodiments, the scope of the following claims are to be accorded the broadest interpretation so as to encompass all such modifications and equivalent structures and functions.

What is claimed is:

1. An image processing apparatus comprising:
an acquiring unit for acquiring a current video frame and a scene model generated based on an input video, wherein said scene model includes visual element models at least representing appearance features in a region of previous video frames thereof, of visual elements;
a first updating unit for updating a first visual element model in said scene model, which match with the visual elements in the region of said current video frame, selected from a plurality of visual element models corresponding to the region;
a second updating unit for updating a second visual element model in the region of said scene model based on the visual elements in the region of said current video frame and the previous video frames, wherein the second visual element model is selected from a plurality of visual element models corresponding to the region which do not match with the visual elements in the region of said current video frame, and the second visual element model is determined as background based on one of the previous video frames.

2. The image processing apparatus according to claim 1, wherein the visual element models in said scene model further represent temporal features in said current video frame and the previous video frames thereof, of the visual elements;
wherein, for anyone of the visual element models in said scene model, which match with the visual elements in said current video frame, said first updating unit further determines the first visual element model as a foreground visual element model or a background visual element model, based on the temporal features of the visual elements in said current video frame, which match with the first visual element model.

3. The image processing apparatus according to claim 2, wherein for anyone of the visual element models in said scene model, which do not match with the visual elements in said current video frame, said second updating unit updates the second visual element model based on difference between the appearance features in said current video frame and a reference visual element model in said previous video frames.

4. The image processing apparatus according to claim 3, wherein for anyone of the visual element models in said scene model, which do not match with the visual elements in said current video frame, the reference visual element model is such a visual element model in said scene model that:
a similarity between the appearance features in said previous video frame and the visual element model in said scene model satisfies a predetermined condition.

5. The image processing apparatus according to claim 1, wherein the appearance features include anyone of texture feature, color feature and illumination feature.

6. The image processing apparatus according to claim 1, further comprising a foreground detecting unit for detecting a foreground from video frames subsequent to said current video frame, based on at least one of the first scene model updated by said first updating unit and second scene model updated by said second updating unit.

7. An image processing method comprising:
an acquiring step of acquiring a current video frame and a scene model generated based on an input video, wherein said scene model includes visual element models at least representing appearance features in a region of previous video frames thereof, of visual elements;
a first updating step of updating a first visual element models in said scene model, which match with the visual elements in the region of said current video frame, selected from a plurality of visual element models corresponding to the region;
a second updating step of updating a second visual element models in the region of said scene model based on the visual elements in the region of said current video frame and the previous video frames, wherein the second visual element model is selected from a plurality of visual element models corresponding to the region, which do not match with the visual elements in the region of said current video frame, and the second visual element model is determined as background based on one of the previous video frames.

8. The image processing method according to claim 7, wherein the visual element models in said scene model further represent temporal features in said current video frame and in the previous video frames thereof, of the visual elements;
wherein, for anyone of the visual element models in said scene model, which match with the visual elements in said current video frame, the first visual element model is further determined as a foreground visual element model or a background visual element model, based on the temporal features of the visual elements matched with the first visual element model in said current video frame, in said first updating step.

9. The image processing method according to claim 8, wherein for anyone of the visual element models in said scene model, which do not match with the visual elements in said current video frame, the second visual element model is updated based on difference between the appearance features in said current video frame and a reference visual element model in said previous video frames.

10. The image processing method according to claim 9, wherein for anyone of the visual element models in said scene model, which do not match with the visual elements in said current video frame, the reference visual element model is such a visual element model in said scene model that:

a similarity between the appearance features in said previous video frames of it and the visual element model in said scene model satisfies a predetermined condition.

11. A non-transitory computer-readable storage medium storing instructions capable of causing a processor to perform an image processing method comprising:

an acquiring step of acquiring a current video frame and a scene model generated based on an input video, wherein said scene model includes visual element models at least representing appearance features in a region of previous video frames thereof, of visual elements;

a first updating step of updating a first visual element models in said scene model, which match with the visual elements in the region of said current video frame, selected from a plurality of visual element models corresponding to the region;

a second updating step of updating a second visual element models in the region of said scene model based on the visual elements in the region of said current video frame and the previous video frames, wherein the second visual element model is selected from a plurality of visual element models corresponding to the region, which do not match with the visual elements in the region of said current video frame, and the second visual element model is determined as background based on one of the previous video frames.

* * * * *